United States Patent [19]

McKeon

[11] 4,138,154
[45] Feb. 6, 1979

[54] SLIDING COVER FOR A TRUCK

[76] Inventor: James J. McKeon, 645 Clinton St., Brooklyn, N.Y. 11232

[21] Appl. No.: 795,678

[22] Filed: May 11, 1977

[51] Int. Cl.² .............................................. B60P 3/00
[52] U.S. Cl. .................................... 296/98; 296/137 D
[58] Field of Search ............... 296/98, 137 D; 160/23, 160/25, 235, 133

[56] References Cited

U.S. PATENT DOCUMENTS

| | | | |
|---|---|---|---|
| 1,658,513 | 2/1928 | Burnbarger | 160/23 R X |
| 1,835,405 | 12/1931 | Kaplan et al. | 296/137 D |
| 2,248,538 | 7/1941 | Liebler | 296/98 |
| 3,472,548 | 10/1969 | Comisac | 296/98 X |

Primary Examiner—Joseph F. Peters, Jr.
Assistant Examiner—Norman L. Stack, Jr.

Attorney, Agent, or Firm—Allison C. Collard; Thomas M. Galgano

[57] ABSTRACT

An overhead door assembly for a truck, includes an overhead door, composed of a multiplicity of pivotably connected flat panels, which is coupled to a rotatable winding drum, to permit coiling and uncoiling thereon and, in turn, closing and opening of the door. The assembly also includes at least one cable, one end of which is coupled to the door and the other end of which is secured to a rotatable cable winding drum, to permit coiling and uncoiling of the cable thereon. A device is provided for positively rotating the door winding drum to effect coiling of the door thereon and, in turn, movement of the door to the open position, and a device is also provided for positively rotating the cable winding drum to effect coiling of the cable thereon and, in turn, movement of the door to the closed position.

7 Claims, 6 Drawing Figures

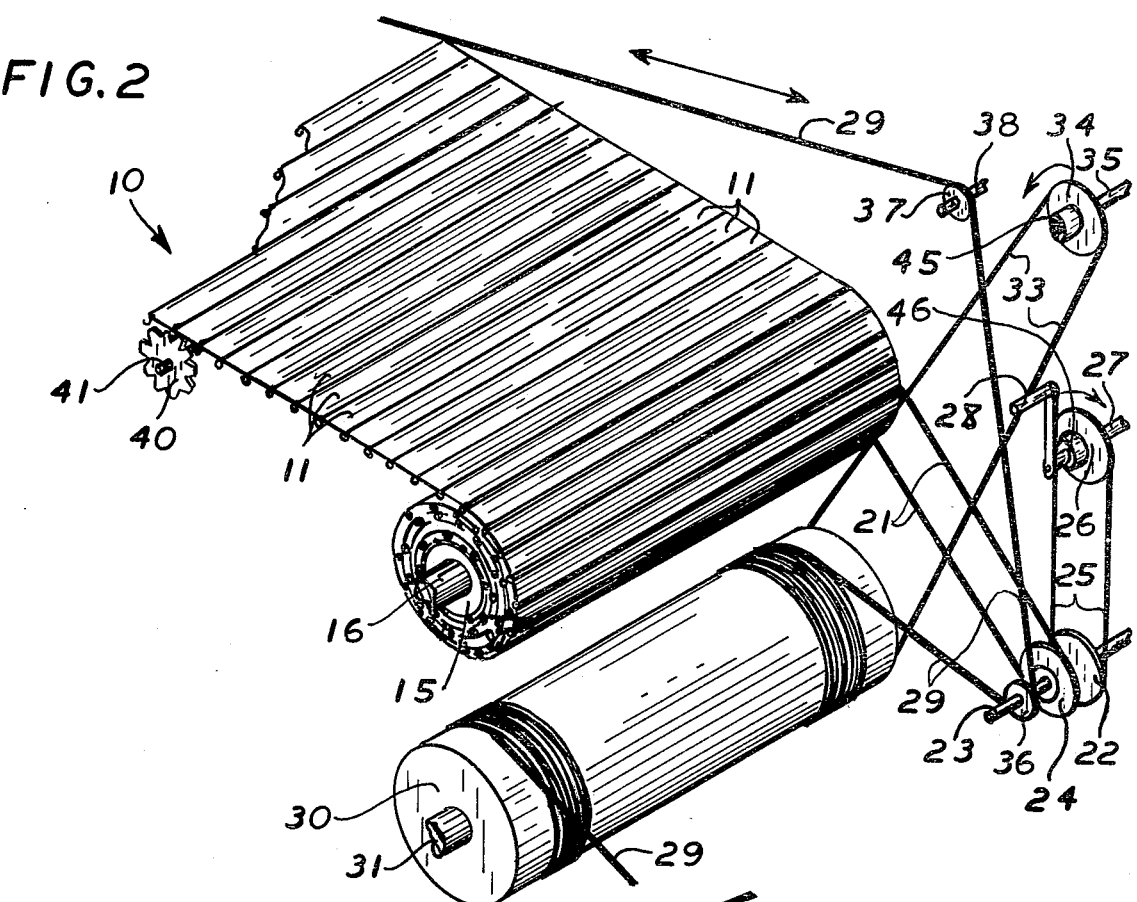
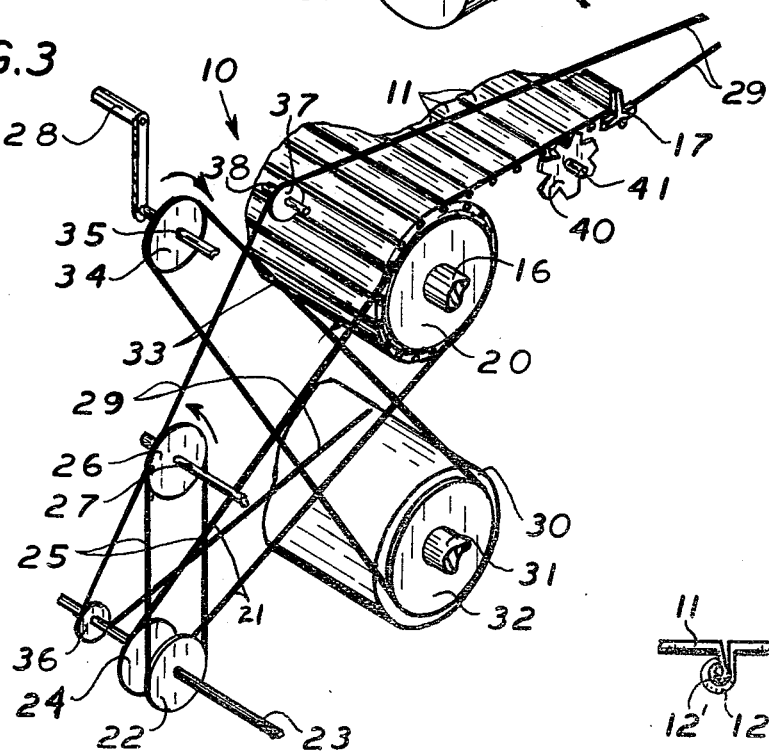
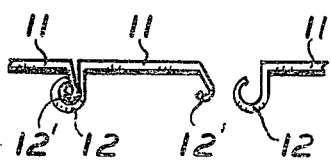

SLIDING COVER FOR A TRUCK

This invention relates to an improved covering for bulk-loading trucks. More particularly, it relates to an improved overhead, sliding door assembly, which is used to cover the goods transported during transit.

Presently, most bulk-loading trucks simply employ a canvas cover or tarpaulin, which is tied down over the cargo hold of the truck to cover the goods during transport. Use of this type of covering is disadvantageous for a number of reasons. Firstly, they are easily ripped or torn, which requires their periodic replacement. Secondly, due to their sagging nature, they may often be soiled or contaminated by the cargo transported, which also requires their periodic replacement. Thirdly, they may often be thrown off the truck due to high winds or high speeds of the truck. Fourthly, they do not effectively completely cover the cargo, which may lead to loss of cargo during transport, or cause air pollution, such as when bulk items, such as coal, sand or dirt or other fungible items are transported.

Accordingly, it is an object of the present invention to provide an improved overhead cover for bulk-loading trucks, which may be readily opened and closed.

It is also an object of the instant invention to provide an improved overhead door assembly, which affords a relatively rigid overhead covering, which effectively seals the cargo-containing compartment of the truck and which requires little, if no, maintenance.

It is a further object of the invention to provide an improved overhead door assembly for a bulk-loading truck, which is of relatively inexpensive construction, durable and reliable in operation.

Certain of the foregoing and related objects are readily attained in an overhead door assembly for a truck, which includes an overhead door comprised of a multiplicity of elongated, flat, generally rectangular, relatively rigid panels, successively disposed adjacent to one another with each of the panels being pivotably secured along their longitudinal edges to the panels adjacent thereto, to permit coiling and uncoiling of the door. The door is slidably movable on the walls of the truck to permit movement thereof between an open and closed position. The assembly also includes a rotatable door winding drum, to which one end of the door is coupled, to permit coiling and uncoiling of the door thereon, at least one cable, one end of which is coupled to the other end of the door, and a rotatable cable winding drum, to which the other end of the cable is coupled, to permit coiling and uncoiling of the cable thereon. Means are also provided for positively rotating the door winding drum to effect coiling of the door thereon, and, in turn, movement of the door to the open position. Means are also provided for positively rotating the cable winding drum, to effect coiling of the cable thereon and, in turn, movement of the door to a closed position thereof.

Preferably, the assembly additionally includes a freely rotatable first shaft, on which the door winding drum is coaxially mounted, and a freely rotatable second shaft, on which the cable winding drum is coaxially mounted, disposed generally beneath and parallel to the first shaft, with each of the shafts having a pulley mounted thereon. Most advantageously, the drive means for the cable winding drum includes a freely rotatable cable drive shaft having a pulley mounted thereon, spaced from and parallel to the second shaft, and an endless belt received about the pulley mounted on the cable drive shaft and the pulley mounted on the second shaft. Most desirably, the assembly also includes a crank handle coupled to the cable drive shaft for effecting rotation thereof.

Preferably, the drive means for the door winding drum includes a freely rotatable door drive shaft, having a pulley mounted thereon, spaced from and parallel to the first shaft and, a freely rotatable transfer shaft having two pulleys mounted thereon, spaced from and parallel to the first and second shafts and the door drive shaft. An endless belt is received about the pulley mounted on the first shaft and one of the pulleys mounted on the transfer shaft, and an endless belt is received about the pulley mounted on the door drive shaft and the other pulley mounted on the transfer shaft. Most desirably, the assembly also includes a crank handle coupled to the door drive shaft for effecting rotation thereof.

In a preferred embodiment of the invention, the transfer shaft has at least one freely rotatable pulley mounted thereon and the assembly additionally includes at least one pair of freely rotatable guide pulleys, one of which is supportable on one of the side walls of the truck adjacent to the top edge thereof at the forward end thereof, and the other of which is supportable on the side wall adjacent to the top edge thereof, at the rearward end thereof; the cable being guided about the freely rotatable pulley mounted on the transfer shaft and the pair of guide pulleys.

In a particularly preferred embodiment, each of the panels of the door has a longitudinally-extending, generally hook-shaped flange extending from each of the longitudinal edges thereof, one of which is dimensionally smaller than the other, and wherein the smaller, hook-shaped flange of the panels is provided received within the larger, hook-shaped flange of the adjacent panel, to permit pivotal movement with respect to one another. In addition, the assembly advantageously includes at least one pair of spaced-apart, freely rotatable toothed wheels disposed adjacent to the door winding drum, which facilitate guiding of the door as it is coiled and uncoiled thereon.

Other objects and features of the present invention will become apparent from the following, detailed description considered in connection with the accompanying drawings, which disclose the embodiments of the invention. It is to be understood, however, that the drawings are designed for the purpose of illustration only, and not as a definition of the limits of the invention.

In the drawings, wherein similar reference characters denote similar elements throughout the several views:

FIG. 2 is a fragmentarily-illustrated, perspective view of the overhead door assembly;

FIG. 3 is a fragmentarily-illustrated, perspective view of the overhead door assembly at a different viewing angle;

FIG. 4 is a side, elevational view of the overhead door, showing two, adjacent panels pivotably coupled together and a third panel spaced therefrom;

Figure 1:
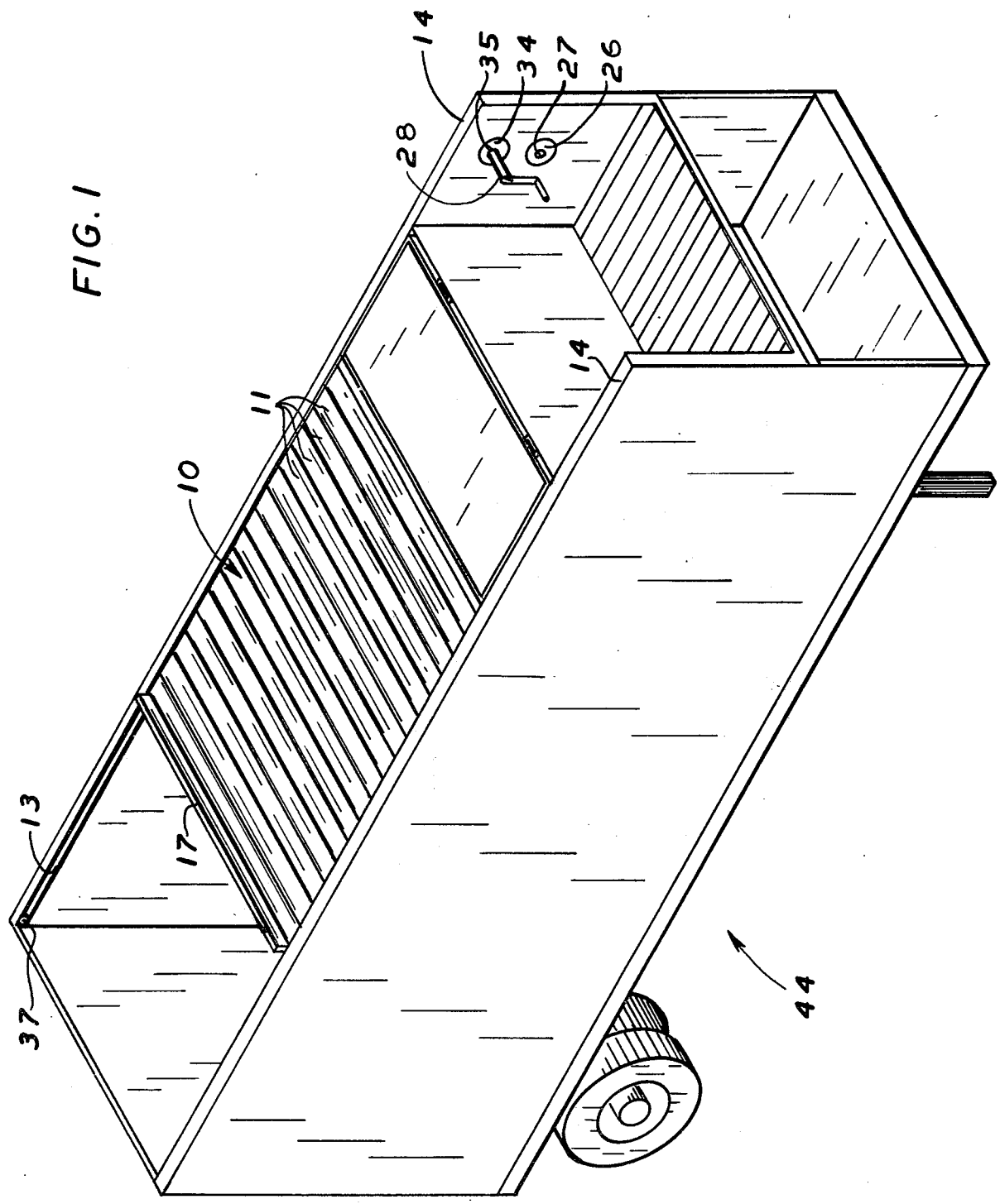
FIG. 1 is a perspective view of an overhead loading cargo compartment of a truck, in which the overhead door assembly embodying the present invention, is incorporated.

Turning now in detail to the appended drawings, therein illustrated is an overhead door assembly, embodying the present invention and including an overhead door 10, which includes a multiplicity of interconnected, elongated, flat, generally rectangular, rigid slats or panels 11, successively disposed adjacent to one another. As can be seen more clearly in FIG. 4, each of the panels 11 has a pair of longitudinally-extending, generally hook-shaped flanges 12, 12', each depending from opposite longitudinal edges thereof, one of which 12', is dimensionally smaller than the other flange 12. The smaller, hook-shaped flange 12' of one panel is pivotably received within the larger, hook-shaped flange 12 of the adjacent panel, to permit relative pivotal movement therebetween and, in turn, coiling and uncoiling of door 10.

One end of door 10 is secured to an elongated, inverted, T-shaped rail 17, which is supported at its ends for sliding movement between the forward and rearward end of the cargo compartment 44, by a pair of inwardly-opening, generally U-shaped, elongated channels 13, mounted on the opposing inner walls of opposite double-walled side walls 14 of the cargo compartment 44 of the truck, along their top edges; these channels also slidably support door 10 as it is moved between an open and closed position. The other end of door 10 is coupled to a door winding drum 15, mounted on a freely rotatable shaft 16, which is disposed perpendicularly to the side walls, and the ends of which are rotatably supported in the side walls 14 by means not shown.

As seen more clearly in FIG. 3, door winding drum shaft 15 also supports a coaxially-mounted pulley 20, which is coupled by means of an O-belt 21 to a first pulley 24, fixed on an intermediate rotatable shaft 23, the ends of which are rotatably supported in the side walls 14 (by means not shown), spaced from and disposed parallel to shaft 15. Intermediate shaft 23 also has a second pulley 22 fixed thereon which is, in turn, coupled by means of an O-belt 25 to a pulley 26, coaxially mounted on a rotatable door-winding drive shaft 27, spaced above and disposed parallel to the shaft 23; shaft 27 also being suitably supported in the side walls 14 of the cargo hold (by means not shown), to permit free rotation thereof. As shown in FIG. 2, a crankshaft handle 28 can be coupled to drive shaft 27, by means of collar 45 fixed on shaft 27, to effect rotation thereof; the drive shaft 27 could, of course, be motor-driven (not shown) as well. Turning crank shaft handle 28 in a clockwise direction, will impart a clockwise rotational motion to drive shaft 27 and pulley 26 which, in turn, is transmitted by O-belt 25 and pulley 22, to intermediate shaft 23 and pulley 24. Clockwise rotational movement of pulley 24 will, in turn, impart by means of O-belt 21, clockwise rotational movement of shaft 16 and door winding drum 15. This, consequently, causes winding of door 10 on drum 15 and, in turn, opening thereof; door 10 being pulled toward and forward end of the cargo compartment 44, while the lateral ends thereof are supported in channels 13. A pair of freely rotatable, toothed wheels 40 (only one of which is shown) supported on shafts 41 are mounted on the side walls 14 (by means not shown), between the forward end of channels 13 and door winding drum 15, to guide door 10 as it is moved therebetween.

To effect closing of door 10, a pair of cables 29 are provided, each of which has one end which is secured to one of the opposite ends of T-shaped bar 17, and the other ends of which are fastened to opposite ends of coil winding drum 30, mounted on coil drum shaft 31, which is disposed generally beneath and parallel to door winding drum shaft 15. From cable winding drum 30, each of cables 29 is guided around a freely rotatable or sliding pulley 36 (only one of which is illustrated), mounted on intermediate shaft 23, and are then guided successively about two freely rotatable guide pulleys 37, (the guide pulleys for only one cable being illustrated), one of which is mounted on a shaft 38, mounted on side wall 14 and disposed in front of the forward end of U-shaped channel 13, and the other of which is mounted on a shaft 38, mounted on side wall 14 and disposed adjacent the rearward end of U-shaped channel 13. Cables 29 are looped around rearwardly-disposed guide pulleys 38, so as to define an upper and lower run thereof, the ends of the lower runs of which are connected to T-shaped bar 17.

Figure 6:
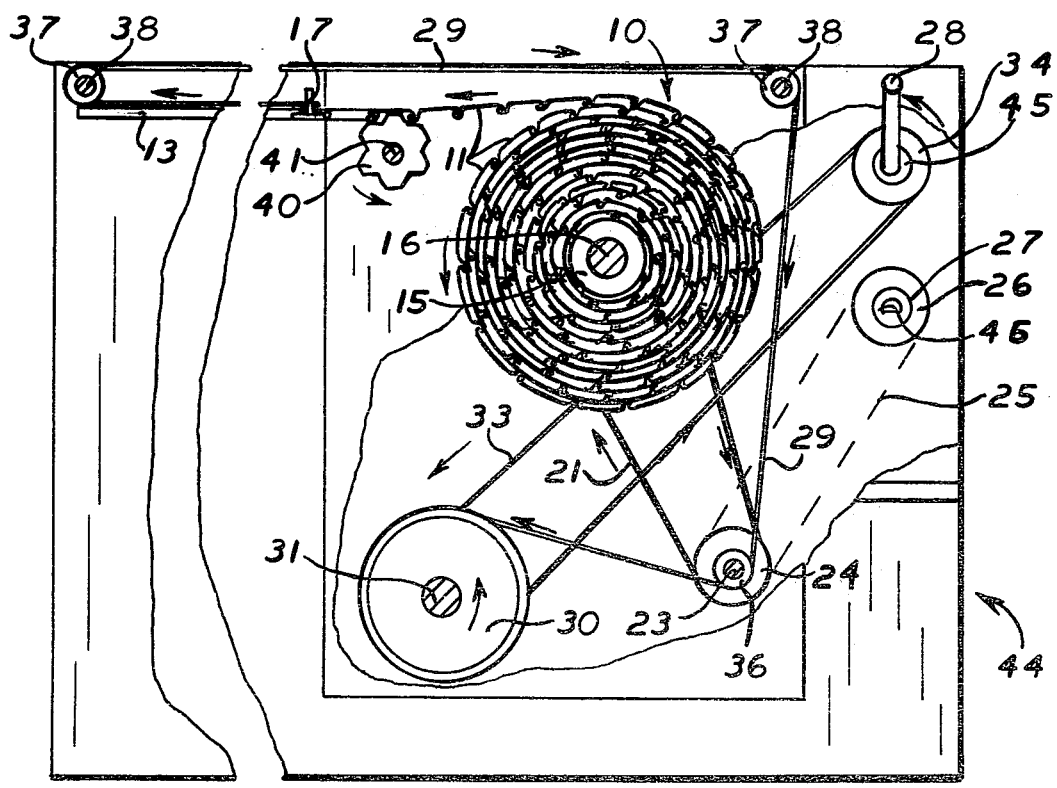
FIG. 6 is a fragmentarily-illustrated, side elevational view, similar to that of FIG. 5, showing the door being moved from an open position to a closed position.

Cable-winding drum shaft 31 also supports coaxially-mounted pulley 32, which is coupled by means of O-belt 33 to drive pulley 34, fixed on cable drive shaft 35. Crank handle 28 may also be coupled to cable drive shaft 35 (by means of collar 46), to effect rotation thereof. As can be seen in FIG. 6, turning crank shaft handle 28 in a counter-clockwise direction, will impart a counter-clockwise rotational movement to cable drive shaft 35 and pulley 34, which, in turn, is transmitted by O-belt 33 and pulley 32, to cable-winding drum shaft 31. This, in turn, will effect a counter-clockwise rotation of the cable-winding drum 30, which will, in turn, cause winding of cables 29 thereon. Consequently, the lower run of cables 29, connected to T-shaped bar 17, will be pulled toward the rear end of the cargo compartment 44 of the truck and, in turn will pull door 10 with it, thus causing closing of door 10.

Figure 5:
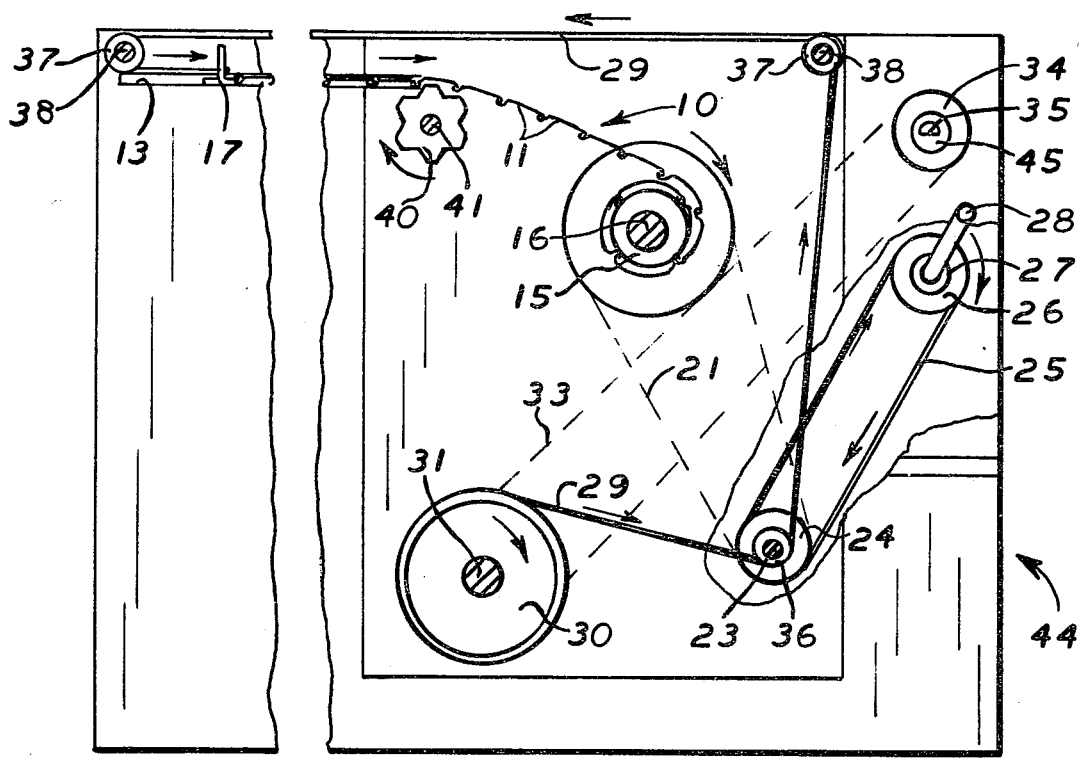
FIG. 5 is a fragmentarily-illustrated, side elevational view of the overhead door assembly, mounted in the cargo compartment of the truck, showing the door being moved from a closed position to an open position.

Thus, as seen from the foregoing, when the operator desires to open door 10 (see FIG. 5), he simply attaches crank shaft handle 28 to drive shaft 27 and rotates it clockwise. This, in turn, through the pulley assembly, will cause clockwise rotation of door-winding drum 16 which, it turn, causes door 10 to be wound thereon. Winding of door 10 on drum 15 will, in turn, pull cables 39 with it, causing their unwinding from cable drum 30, with the cables being guided along freely rotatable pulleys 37 and freely rotatable pulley 36, mounted on intermediate shaft 23. Conversely, when the operator wishes to close the door (see FIG. 6), he simply connects the crank shaft handle to the cable-winding drive shaft 35 and by counter-clockwise rotation thereof, will effect, through the pulley assembly, counter-clockwise rotation of cable-winding drum 30, causing cables 29 to be wound thereon. Winding of cables 29 on drum 30 will cause the ends of the lower runs thereof to be pulled rearwardly and, in turn, uncoiling of overhead door 10; door 10 being guided along U-shaped channels 13 to effect closing of the cargo compartment.

While only one embodiment of the present invention have been shown and described, it will be obvious to those persons of ordinary skill in the art, that many changes and modifications may be made thereunto without departing from the spirit and scope of the invention.

What is claimed is:

1. An overhead door assembly for a truck, including a pair of spaced-apart, upstanding sidewalls having means adjacent to the top edges thereof for slidably supporting therebetween a generally horizontally-disposed door, comprising:

an overhead door, including a multiplicity of elongated, flat, generally rectangular, relatively rigid panels, successively disposed adjacent to one another, with each of said panels being pivotably secured along their longitudinal edges to the panels adjacent thereto, to permit coiling and uncoiling of said door, said door being slidably movable on the walls of the truck to permit movement thereof between an open and closed position;

a rotatable door winding drum, to which one end of said door is coupled to permit coiling and uncoiling of said door thereon;

at least one cable, one end of which is coupled to the other end of said door;

a rotatable cable winding drum to which the other end of the cable is coupled, to permit coiling and uncoiling of said cable thereon;

a freely-rotatable first shaft on which said door winding drum is coaxially mounted, and a freely-rotatable second shaft on which said cable winding drum is coaxially mounted, disposed generally beneath and parallel to said first shaft, each of said shafts having a pulley mounted thereon;

drive means for positively rotating said door winding drum, to effect coiling of said door thereon and, in turn, movement of said door to said open position, said drive means for said door winding drum including a freely-rotatable door drive shaft having a pulley mounted thereon, spaced from and parallel to said first shaft, a freely-rotatable transfer shaft having two pulleys mounted thereon, spaced from and parallel to said first and second shafts and said door drive shaft, an endless belt received about the pulley mounted on said first shaft and one of the pulleys mounted on said transfer shaft and an endless belt received about the pulley mounted on said door drive shaft and the other pulley mounted on said transfer shaft;

drive means for positively rotating said cable winding drum to effect coiling of said cable thereon and, in turn, movement of said door to said closed position.

2. The overhead door assembly according to claim 1, wherein said drive means for said cable winding drum includes a freely-rotatable cable drive shaft having a pulley mounted thereon, spaced from and parallel to said second shaft, and an endless belt received about said pulley mounted on said drive shaft and said pulley mounted on said second shaft.

3. The overhead door assembly according to claim 2, additionally including a crank handle mounted on said cable drive shaft for effecting rotation thereof.

4. The overhead door assembly according to claim 1, additionally including a crank handle mounted on said door drive shaft for effecting rotation thereof.

5. The overhead door assembly according to claim 3, wherein said transfer shaft has at least one freely-rotatable pulley mounted thereon, wherein said assembly additionally includes at least one pair of freely-rotatable guide pulleys, one of which is supportable on one of the sidewalls of the truck adjacent to the top edge thereof at one end thereof, and the other of which is supportable on said sidewall adjacent to the top edge thereof at the opposite end thereof, and wherein said at least one cable is guided about said freely-rotatable pulley mounted on said transfer shaft and pair of guide pulleys.

6. The overhead door assembly according to claim 1, wherein each of said panels of said door have a longitudinally-extending, generally hook-shaped flange depending from each of the longitudinal edges thereof, one of which is dimensionally smaller than the other, and wherein the smaller, hook-shaped flange of said panels is pivotably received within the larger, hook-shaped flange of the adjacent panel.

7. The overhead door assembly according to claim 1, additionally including at least one pair of spaced-apart, freely-rotatable, toothed wheels disposed adjacent to said door winding drum, for supporting and guiding said door as it is coiled and uncoiled thereon.

* * * * *

UNITED STATES PATENT OFFICE
CERTIFICATE OF CORRECTION

Patent No. 4,138,154  Dated FEB. 6, 1979

Inventor(s) JAMES J. MCKEON

It is certified that error appears in the above-identified patent and that said Letters Patent are hereby corrected as shown below:

Column 2, line 36, "provided" should read --pivotably--.

Column 3, line 63, "and" should read --the--.

Column 4, line 45, "16" should read --15--.

Signed and Sealed this

First Day of May 1979

[SEAL]

Attest:

RUTH C. MASON  
*Attesting Officer*

DONALD W. BANNER  
*Commissioner of Patents and Trademarks*